United States Patent
Silver et al.

(10) Patent No.: US 8,634,800 B2
(45) Date of Patent: *Jan. 21, 2014

(54) SYSTEM, METHOD, AND APPARATUS FOR USING ALTERNATIVE NUMBERS FOR ROUTING VOICE CALLS AND SHORT MESSAGES IN A COMMUNICATIONS NETWORK

(71) Applicant: Tango Networks, Inc., Richardson, TX (US)

(72) Inventors: Andrew Silver, Frisco, TX (US); Patricia A. Landgren, Plano, TX (US)

(73) Assignee: Tango Networks, Inc., Richardson, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/846,991

(22) Filed: Mar. 19, 2013

(65) Prior Publication Data

US 2013/0225113 A1 Aug. 29, 2013

Related U.S. Application Data

(63) Continuation of application No. 13/307,112, filed on Nov. 30, 2011, now Pat. No. 8,412,241, which is a continuation of application No. 11/750,756, filed on May 18, 2007, now Pat. No. 8,086,254.

(51) Int. Cl.
*H04W 40/00* (2009.01)

(52) U.S. Cl.
USPC ........ 455/404.1; 455/455; 455/410; 455/415; 370/261; 370/328; 370/338

(58) Field of Classification Search
USPC ........ 455/466, 433, 445, 554.1, 414.1, 426.1, 455/551, 410, 415, 455; 370/401, 351, 388, 370/261, 328; 379/88.12, 88.17, 93.23, 379/67.1; 707/999.01; 709/217

See application file for complete search history.

(56) References Cited

U.S. PATENT DOCUMENTS

| | | | |
|---|---|---|---|
| 7,272,716 B2 * | 9/2007 | Haller et al. | 713/156 |
| 7,333,480 B1 * | 2/2008 | Clarke et al. | 370/352 |
| 7,664,495 B1 * | 2/2010 | Bonner et al. | 455/433 |
| 2002/0019246 A1 * | 2/2002 | Forte | 455/555 |
| 2002/0191557 A1 * | 12/2002 | Chow et al. | 370/329 |
| 2005/0195954 A1 * | 9/2005 | Klein et al. | 379/201.04 |
| 2007/0100981 A1 * | 5/2007 | Adamczyk et al. | 709/223 |
| 2008/0268824 A1 * | 10/2008 | Allen et al. | 455/415 |

* cited by examiner

*Primary Examiner* — Mahendra Patel

(57) ABSTRACT

A system, method and computer-readable medium for allowing the use of an alternative numbering plan for delivering short messages to mobile subscribers using the public mobile telephone network is provided. Users of an enterprise or other closed networks as well as users that are not part of a closed network may send short messages destined to members of an enterprise or closed network from their mobile or other devices associated with their subscription using an alternative enterprise directory number, such as the office number, instead of the mobile number, such that the alternative number will be presented at the destination device as the originating number. The recipient may respond to the message by addressing the response to the enterprise or closed network number, and the response may be delivered to the originator's mobile or other device associated with their subscription.

14 Claims, 13 Drawing Sheets

SYSTEM, METHOD, AND APPARATUS FOR USING ALTERNATIVE NUMBERS FOR ROUTING VOICE CALLS AND SHORT MESSAGES IN A COMMUNICATIONS NETWORK

CROSS REFERENCE TO RELATED APPLICATIONS

This application claims priority of and is a continuation of U.S. Ser. No. 13/307,112, entitled SYSTEM, METHOD, AND APPARATUS FOR USING ALTERNATIVE NUMBERS FOR ROUTING VOICE CALLS AND SHORT MESSAGES IN A COMMUNICATIONS NETWORK, filed on Nov. 30, 2011, now issued U.S. Pat. No. 8,412,241, issued on Apr. 2, 2013, which is a continuation of U.S. Ser. No. 11/750,756, entitled SYSTEM, METHOD, AND APPARATUS FOR USING ALTERNATIVE NUMBERS FOR ROUTING VOICE CALLS AND SHORT MESSAGES IN A COMMUNICATIONS NETWORK, filed on May 18, 2007, now issued U.S. Pat. No. 8,086,254, issued on Dec. 27, 2011, incorporated herein by reference in their entirety.

FIELD OF THE INVENTION

The present disclosure relates to telecommunications and, more particularly, to telecommunications including voice calls and short message service, enterprise servers, wireless communications, and the interoperability of communication technologies.

BACKGROUND

Corporations are increasingly relying on the use of cellular technology by their employees, yet enterprises do not have adequate means to control cellular service in terms of costs, Quality of Service, and corporate monitoring. This is because cellular service has conventionally been controlled by wireless carrier networks and managed independently of, and with no connectivity to, the enterprise voice and data networks.

Enterprises today control their enterprise fixed voice and data networks by deployment of private branch exchanges (PBXs). The enterprise may own and manage PBXs within each branch and between branch offices. The enterprise may also own and manage their own data networks and corporate local area network (LAN)/wide area network (WAN). Bulk voice minutes and data capacity may be purchased from land-line carriers, or from other providers that have purchased bulk minutes and data capacity from carriers. The purchased capacity may then be used to connect branch offices using public IP Network providers, e.g., MCI, Sprint, L3, etc., for Data and Voice over IP (VoIP). Heretofore, no mechanisms have been provided to extend the enterprise fixed voice and data networks paradigm to cellular services.

SUMMARY OF THE INVENTION

Embodiments disclosed herein provide mechanisms for enabling the use of an alternative numbering plan for delivering voice calls and short messages to mobile subscribers using the public mobile telephone network. Using the methods described herein, users of an enterprise or other closed networks as well as users that are not part of a closed network may send short messages destined to members of an enterprise or closed network from their mobile or other devices associated with their subscription using an alternative enterprise directory number. The alternative enterprise directory number may comprise an office number of a land-line telephony device. In accordance with embodiments, the alternative enterprise directory number, rather than the mobile number, will be presented at the destination device as the originating number. The recipient can respond to the message by addressing the response to the enterprise or closed network number and it will be delivered to the originator's mobile or other devices associated with their subscription. The disclosure additionally addresses alternative routing of voice calls directed to the enterprise or closed network numbers such as when the public landline networks is not available during an emergency, as well as addressing potential routing conflicts between the public mobile and land-line networks.

BRIEF DESCRIPTION OF THE DRAWINGS

Aspects of the present disclosure are best understood from the following detailed description when read with the accompanying figures, in which.

DETAILED DESCRIPTION

Figure 1:
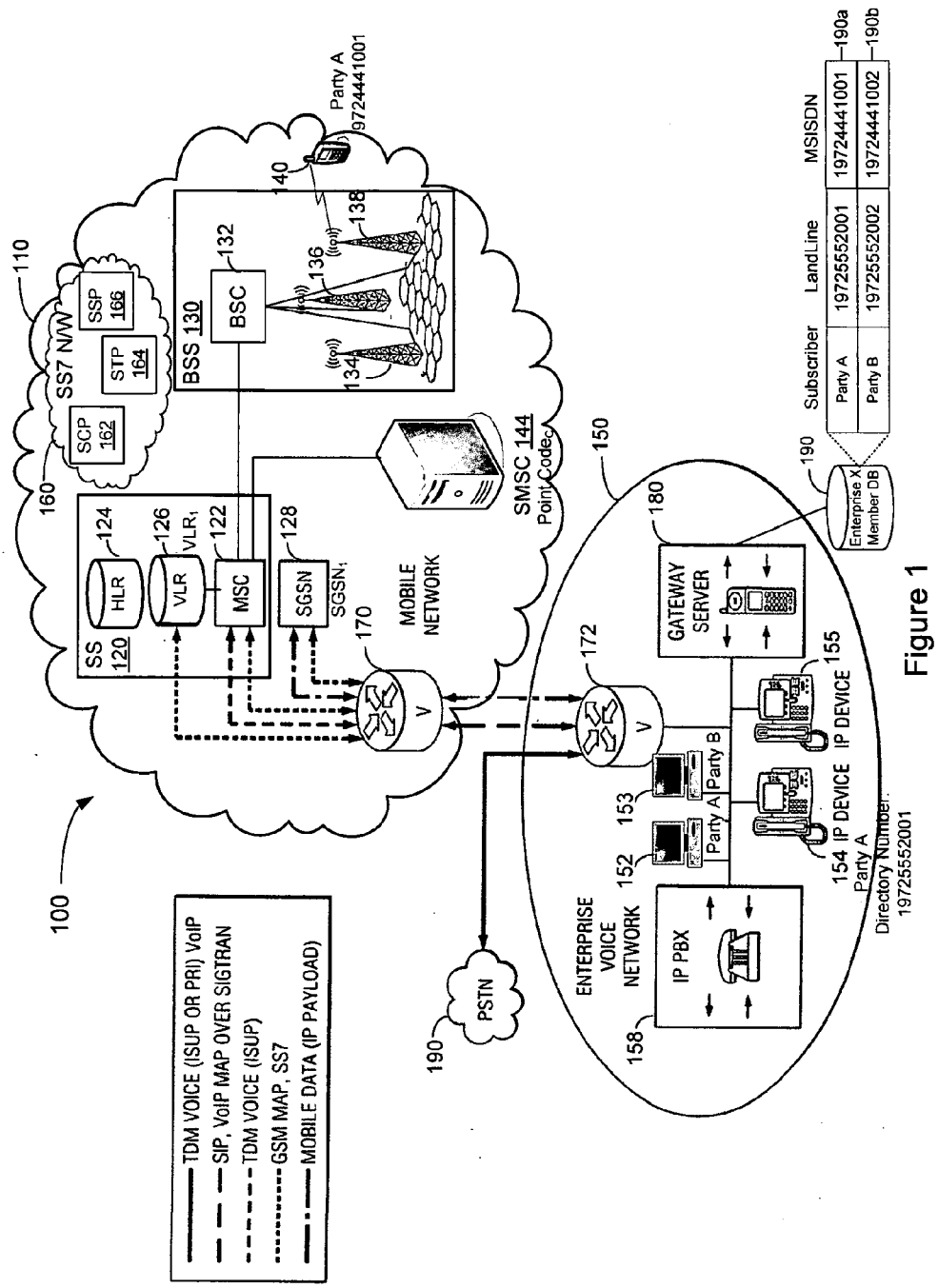
FIG. 1 is a diagrammatic representation of a network architecture in which embodiments disclosed herein may be implemented.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

With the ubiquity of cellular communication devices, it is desirable to seamlessly integrate public wireless voice and data networks with enterprise networks. More particularly, it is desirable to provide enterprise cellular solutions that may operate in conjunction with public network infrastructure. While enterprise-provisioned cellular services may provide enhanced personnel communications and connectivity, the variety of user communication devices, e.g., land-line phones, cellular phones, personal digital assistants, and the like, may introduce challenges for providing timely delivery of communication services. For example, enterprise personnel may be assigned numerous communication devices, such as a land-line phone for use when the employee is at a work station or office, and a cellular phone or a personal digital assistant when the employee is away from the office either at other locations in the enterprise or outside the enterprise premises. Because the employee may be equipped with communication devices best suited for use when the employee is at a particular location as well as a mobile communication device for use when the employee is on the move, persons attempting to contact the employee may not be aware of the best means for communication with the employee at a particular time.

In accordance with the present disclosure, the enterprise is able to equally extend the enterprise fixed voice and data networks paradigm to cellular services by connecting the public wireless voice and data network with the enterprise. A gateway server inter-connects the carrier's Mobile Switching Center (MSC) that manages cellular voice traffic as well as the carrier's Serving GPRS Support Node (SGSN) that manages cellular data traffic, with the enterprise's voice and data network. In accordance with a particular embodiment, a one number service feature may be provided that allows the enterprise subscribers or personnel the use of multiple communication devices with a single enterprise directory number. An enterprise member may be assigned a land-line phone and a cellular telephone and may be only aware of the enterprise directory number of the land-line phone. Likewise, colleagues or personal contacts may only be provided with the enterprise member's land-line phone number yet may advantageously contact the enterprise member on both the enterprise member's land-line phone and cellular telephone using the land-line phone number assigned to the enterprise member. More particularly, an enterprise member may originate short message service (SMS) messages from the mobile terminal assigned to the member. The MSISDN number of the originating mobile terminal may be replaced with the land-line phone number assigned to the member when the SMS message is in transit. Accordingly, a destination user that receives the SMS message will be presented with the land-line number of the originating member. In a similar manner, a contact of the enterprise member may originate an SMS message to the member using the member's land-line enterprise directory number as the destination number of the SMS message. The enterprise land-line number entered as the destination number may be replaced with the land-line phone number assigned to the member when the SMS message is in transit. Accordingly, the enterprise member may then receive the SMS message on the member's mobile terminal although the SMS message was originally addressed to the land-line phone number.

FIG. 1 is a diagrammatic representation of a network 100 architecture in which embodiments disclosed herein may be implemented. Network 100 may include a cellular network system 110, such as a Global System for Mobile (GSM) Communications network, a code division multiple access (CDMA) network, a mobile network utilizing IMT-2000, or another suitable mobile network. Cellular network system 110 generally includes a Switching System (SS) 120 and a Base Station System (BSS) 130. In the examples provided herein, mobile network architecture components are made with reference to the GSM, the most popular standard for mobile phones in the world. GSM is both an air interface and networking protocol. The most popular alternative combines the Code Division Multiple Access (CDMA) air interface protocol and the ANSI-41 networking protocol.

Each of SS 120 and BSS 130 contain a number of functional units well understood by those skilled in the art, and a detailed explanation of the various components is unnecessary. Nevertheless, a cursory review of various components is provided. SS 120 contains a Mobile services Switching Center (MSC) 122, a Home Location Register (HLR) 124, and a Visitor Location Register (VLR) 126. MSCs carry out switching functions and manage the communications between mobile phones and the Public Switched Telephone Network (PSTN) 190. HLR 124 comprises the central database that contains details of each mobile phone subscriber that is authorized to use the cellular core network. VLR 126 comprises a database which stores information about all the mobiles terminals that are currently serviced by the associated MSC (MSC 122 in the present example). VLR 126 stores various information regarding the mobile terminals, such as the current location area identity that specifies a particular base station controller (BSC) that the mobile station is currently serviced by.

Various other sub-systems or functional modules may, and typically are, included in SS 120, such as an Authentication Center, an Equipment Identity Register, or various other functions. A serving general packet radio service (GPRS) support node (SGSN) 128 may be included in cellular network system 110 to facilitate provisioning of packet services to and from mobile terminals in network system 110. GPRS provides mobility management, session management and transport for Internet Protocol packet services in GSM cellular packet networks.

As is understood, various GPRS infrastructure may be included in network system 110 to provide packet services to mobile terminals, and only SGSN 128 of the GPRS core network is depicted to simplify the discussion of embodiments disclosed herein. In general, a gateway GPRS support node may interface the GPRS backbone with an external packet network, such as the Internet.

SGSN 128 may interface with various subsystem of network system 110. For example, SGSN 128 may have a Gs interface with MSC 122 and VLR 126 that facilitates paging and station availability notification when performing data transfers. SGSN 128 may additionally have a Gr interface with HLR 124 through which messaging may be performed, for example, over the Mobile Application Part protocol. SGSN 128 may additionally have a Gb interface with packet control unit (PCU) (not shown) of BSS 130 that facilitates connection of BSS 130 with SGSN 128.

Network system 110 may also include a signaling system, such as a SS7 network 160. SS7 network 160 provides a set of telephony signaling protocols which are used to set up the vast majority of the world's PSTN telephone calls. SS7 network 160 is also used in cellular networks, such as GSM and UMTS, for circuit switched voice and packet-switched data applications. As is understood, SS7 network 160 includes various signaling nodes, such as any number of service control points (SCPs) 162, signal transfer points (STPs) 164, and service switching points (SSPs) 166.

BSS 130 contains a Base Station Controller (BSC) 132 that may be in communication with and in control of a plurality of Base Transceiver Stations (BTSs) 134-138. Each individual BTS 134-138 under the control of a given BSC 132 may define a radio cell operating on a set of radio channels thereby providing service to a Mobile Terminal (MT) 140.

Network system 110 may also include a short message service center (SMSC) 144 adapted to deliver short message service (SMS) messages to mobile terminals. When an SMS message is sent to a user, the SMS message is stored in SMSC 144 which delivers it to the destination mobile terminal when the destination mobile terminal is available. As is known, the SMS message may be delivered via a control channel, e.g., a cell broadcast control channel, or bearer channel.

Network 100 may include an enterprise network 150, such as a switched Ethernet, that interconnects various network nodes via various network infrastructure, such as hubs and switches. In the illustrative example, enterprise network 150 includes various client nodes, such as desktop clients 152 and 153, land-line Internet Protocol (IP) telephones 154-155, and an IP private branch exchange (PBX) 158 which carries calls over IP, e.g., via voice over IP (VoIP). Enterprise network 150 may interface with the PSTN 190 via a router 172 disposed at the enterprise.

Likewise, enterprise network 150 may interface with cellular network system 110 via routers 170 and 172. It is understood that enterprise network 150 may, and typically does, include hundreds or thousands of client devices and networking nodes, and the architecture depicted in FIG. 1 is greatly simplified to facilitate a discussion of embodiments disclosed herein.

In accordance with an embodiment, an enterprise gateway server 180 may be deployed in enterprise network 150 that is adapted to inter-connect the mobile network's MSC 122 that manages cellular voice traffic as well as the SGSN 128 that manages cellular data traffic. Enterprise gateway server 180 may include or interface with a softswitch media gateway 181. From an IT organization perspective, gateway server 180 appears as an extension to PBX 158. To cellular network system 110, gateway server 180 appears as a standard in-network endpoint for delivering calls. To PBX 158, gateway server 180 appears as a set of standard PBX endpoints (e.g. deskphones, or IP clients). Gateway server 180 mediates between the two disparate sets of network protocols and state machines.

Gateway server 180 may include the network functions for both voice (gateway MSC) and data (gateway GPRS Support Node or Home Agent), VoIP capability for interconnecting mobile network 110 with enterprise network 150 thereby eliminating PSTN interconnect charges, a billing gateway, and a next-generation Network Services gateway that enables third party value added services for the enterprise, such as mobile phone activation/de-activation, corporate directory integration based on IMS (IP Multimedia Subsystem), or other services. Gateway server 180 may also include the element management subsystem (EMS) and a service management subsystem for the operational support system (OSS).

In the example depicted in FIG. 1, call control may be managed by the enterprise in which the gateway server is located. In this implementation, the gateway server interfaces with cellular network system 110 nodes supporting SS7 and SIP or other messaging with the carrier network, and the cellular network must be able to address gateway server 180 in order to send and receive messages.

Figure 2:
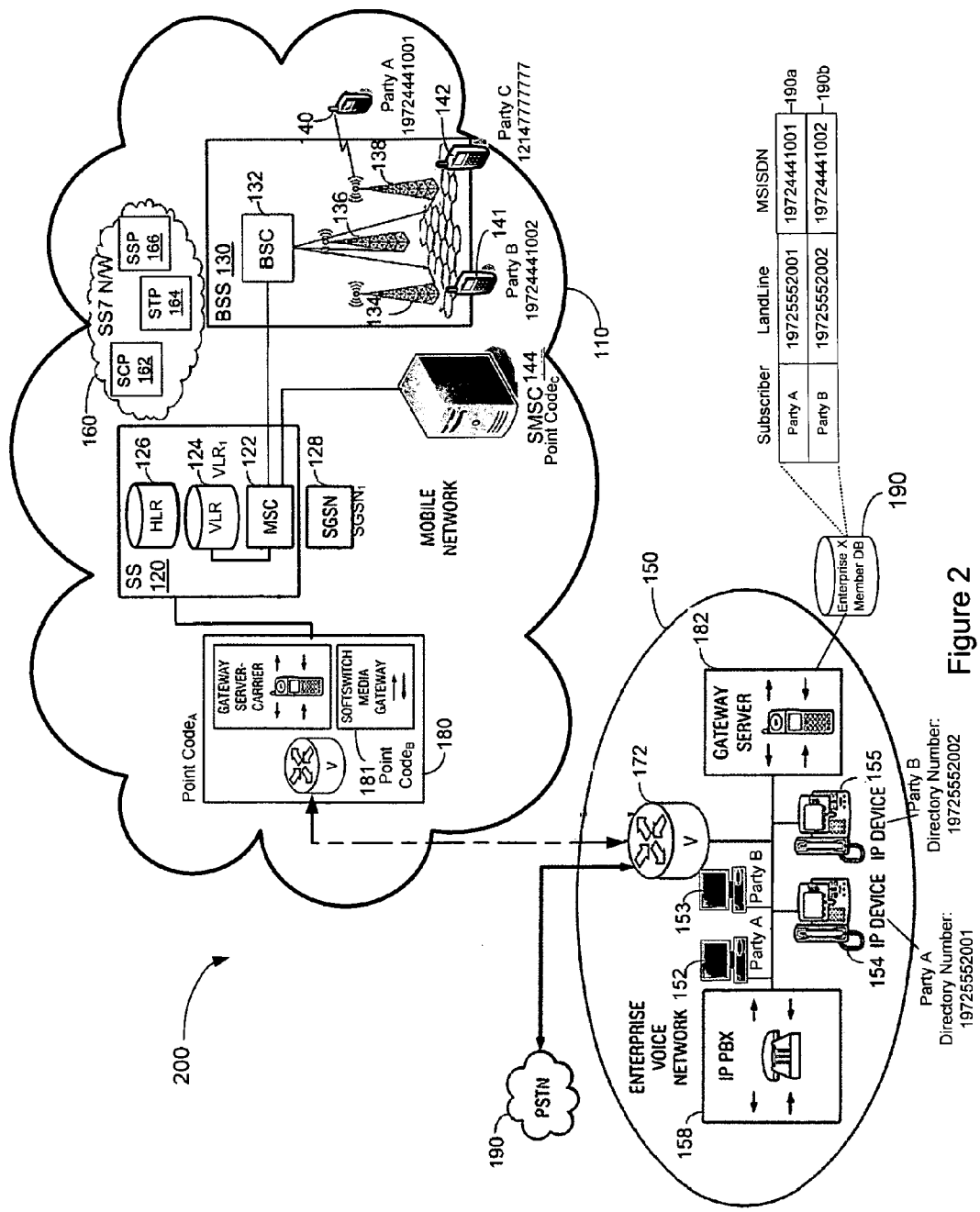
FIG. 2 is a diagrammatic representation of another network architecture featuring split call control in accordance with an embodiment.

In another embodiment, call control may be split or partitioned between the carrier and enterprise networks as depicted in the network configuration 200 of FIG. 2. In this implementation, an enterprise gateway server (GS-E) 182 interacts with a carrier gateway server (GS-C) 180 deployed in the carrier network. The connection between GS-E 182 and GS-C 180 may be made over SIP or other protocols. This configuration may enable cellular network system 110 to have a central point of control for interacting with multiple enterprises, and may not require the use of SS7 messaging to the enterprise. Rather, it is possible to have a secure IP connection supporting SIP. This is also useful for offering a Centrex solution for interconnecting with a carrier-hosted PBX, or for interconnecting a carrier-hosted gateway server with enterprise-hosted PBX 158 systems. GS-C 180 may support an SS7 point code multiplexer in which only one or two point codes are needed to address all enterprises since GS-C 180 can identify for which enterprise the message is intended. In the illustrative example, GS-C 180 has a point code "Point Code$_A$," and softswitch media gateway 181 has a point code "Point Code$_B$". GS-E 182 may be adapted to provision GS-C 180 automatically over the IP interface to manage subscribers, e.g., to add new pilot directory numbers (DNs) for new subscribers. In this case, originating and terminating triggers used in cellular network system 110 for routing calls to GS-C 180 can add identifying information of the specific enterprise in the triggering messages. Alternatively, GS-C 180 may identify the enterprise based on the calling party information.

In the illustrative examples provided herein, Party A and Party B are both members of enterprise network 150. Party A is assigned a mobile terminal 140 having an MSISDN of 1-972-444-1001, and Party B is assigned a mobile terminal 141 having an MSISDN of 1-972-444-1002. Party A is assigned enterprise land-line telephony device 154 having an enterprise directory number of 1-972-555-2001, and Party B is assigned enterprise land-line telephony device 155 having an enterprise directory number of 1-972-555-2002. Additionally, Party A and Party B are assigned a respective desktop client 152 and 153. In some examples, reference is made to another mobile terminal user, Party C, that is not a member of enterprise network 150. In the illustrative example, Party C is assigned a mobile terminal 142 having an MSISDN of 1-214-777-7777.

GS-E 182 may include or interface with an Enterprise member database 190 that stores records or profiles that define services for members of enterprise network 150. Enterprise member database 190 may facilitate one number servicing implemented in accordance with embodiments by associating a land-line telephony device and a mobile terminal commonly assigned to a particular enterprise member. For example, enterprise member database 190 may include a record 190*a* allocated for Party A that is a member of enterprise network. In the illustrative example, record 190*a* includes a Land-line field that stores an enterprise directory number of a land-line telephony device 154 assigned to Party A, and an MSISDN field that stores a directory number of mobile terminal 140 assigned to Party A. In this manner, the land-line number and the directory number (MSISDN) of the mobile terminal of the user Party A are associated with one another. In a similar manner, Party B that is a member of enterprise network 150 has a record 190*b* that associates the enterprise directory number of an enterprise telephony device 155 assigned to Party B with the mobile number of mobile terminal 141 assigned to Party B.

In general, exemplary processing routines described herein are provided with reference to a split call control configuration featuring both enterprise and carrier gateway servers. However, embodiments disclosed herein are not limited to such a configuration and may be similarly implemented in a system deploying a gateway server in the enterprise as depicted in FIG. 1 as will be apparent to those skilled in the art.

Figure 3:
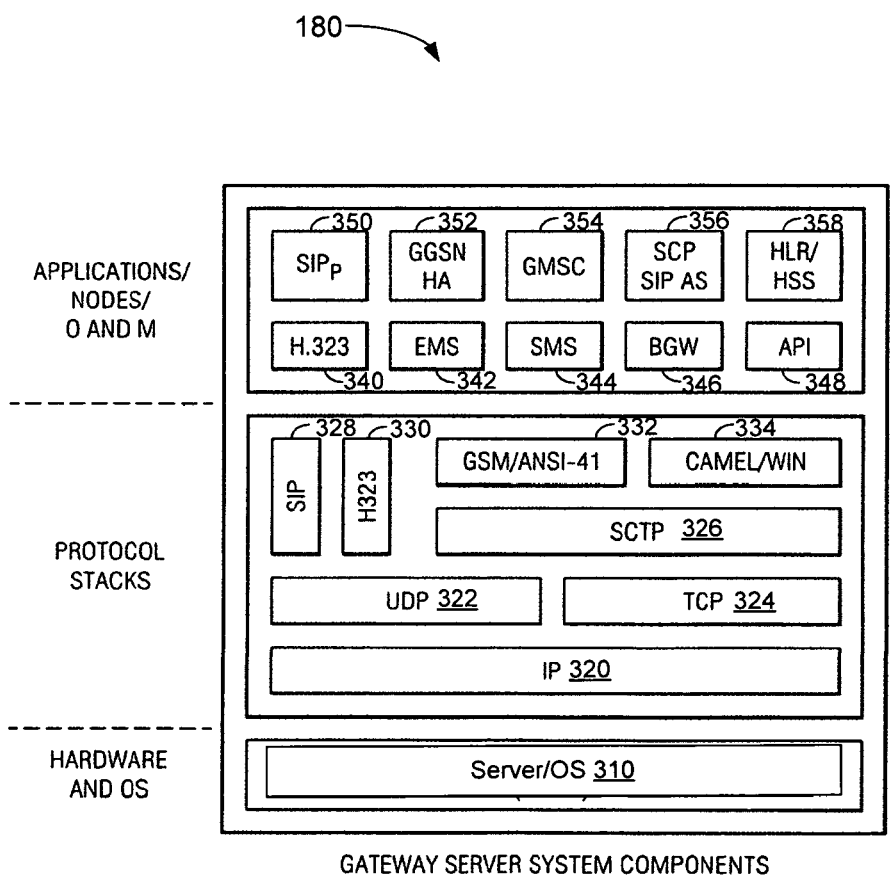
FIG. 3 is a diagrammatic representation of an embodiment of gateway server implemented in accordance with an embodiment.

FIG. 3 is a diagrammatic representation of an embodiment of gateway server 180 depicted in FIG. 1. Gateway server 180 includes hardware and an operating system 310, such as an instance of the Unix operating system. Various protocol stacks may be deployed and run by the gateway server. In the illustrative example, the gateway server includes a network layer 320, such as an Internet Protocol layer. Transport layer (s), such as user datagram protocol (UDP) 322, transport control protocol (TCP) layer 324, and stream control transmission protocol (SCTP) layer 326, may be included in the gateway server and interface with the lower network layer 320 and applications above the transport layer. Application layers that interface with lower transport layers may include a session initiation protocol (SIP) layer 328 for creating, modifying, and terminating sessions with one or more devices and H.323 compliant layer 330 for provisioning of communication sessions over a packet network. The gateway server additionally includes mobile networking protocol layers, such as ANSI-41 and GSM layers 332. Advanced intelligent network and wireless intelligent network capabilities may be provided by the gateway server via, for example, a Customized Applications for Mobile networks Enhanced Logic (CAMEL) layer 334 and/or a wireless intelligent network (WIN) layer that allows an operator to define services over and above standard services provided by the GSM standards. The gateway server may include any variety of applications, such as H.323 communication application 340, an element management subsystem 342, a short message service system 344, BGW 346, and an application programming interface 348. Additionally, the gateway server may include a session initiation protocol layer 350, gateway GPRS support node home agent application 352, gateway mobile services switching center 354, session control protocol 356, and home location register/home subscriber server application 358. Various other applications may be included in addition to, or in lieu of, any one or more of the depicted applications.

The gateway server enables the enterprise to manage and control its cellular service in addition to providing a significant overall cost reduction for telecommunications. Moreover, the gateway server includes an overall platform and architecture for improved and integrated wireless enterprise solutions and facilitates convergence between the enterprise's cellular and Voice over IP (Internet Protocol) infrastructure.

The gateway server leverages the benefits of Voice over IP with cellular to extend the cellular network into the enterprise. The gateway server addresses both cellular voice and data, and is a networking solution that works together with the enterprise's existing PBX, performing mobile call control functions (routing and services).

Additionally, the gateway server bridges the enterprise PBX and public cellular environments to enable telecom applications for the cellular user, such as short-code dialing (e.g. 4 and 5-digit dialing), one number service (one phone number for the land-line and cellular phone), and single voice mail box that services both a user's land-line and cellular telephone. The gateway server enables the enterprise to leverage existing telecom assets for cellular use (e.g., least-cost routing over a corporation's VoIP or leased-lines network for discounted long distance; use of existing PBX voicemail system).

The gateway server is an application platform for deploying mobile IT applications. Either the enterprise IT department or a Systems Integrator may develop and integrate specific applications to interface with the corporation's cellular devices. For example, the enterprise can choose to replace the desk phone of an office employee with an inexpensive mobile phone. For this employee, when they 'badge-out' of the building at the end of the day, the enterprise security budging system can be used to inform the gateway server to de-activate the mobile phone, until the employee returns to the office and 'badges-in' the next morning. Alternatively, the gateway server can track and record the calls made outside the office hours, and enable the enterprise to charge them to the business, to the employee, or record them as a corporate benefit.

The gateway server may be a software-only solution that can execute on standard, inexpensive Linux platforms. The gateway server may comprise a mobile core network (for call handling and routing) and services network (voice and data services such as PBX-based short code dialing, voicemail, conference calling, VPN, etc.) components. It may be appropriately scaled down to the smaller subscriber base of a decentralized large enterprise, in the order of hundreds to several thousand subscribers, compared with carrier systems that manage many millions of "centralized" subscribers. The gateway server is designed to be managed and maintained by the same IT group that currently manages the enterprise's PBX system.

In accordance with an embodiment, one number service provides for call termination with multiple terminals, e.g., a land-line phone and a cellular telephone. An enterprise employee may be assigned a land-line phone and a cellular telephone and may use a single destination number for either device for receiving and originating telephone calls and data service. Accordingly, users attempting to contact an enterprise employee need only have a single phone number assigned to the employee for making a phone call to either the employee's land-line phone or cellular telephone. In accordance with a particular embodiment, short message service (SMS) messages may be originated by an enterprise employee from a cellular telephone assigned thereto, and the SMS message may ultimately be delivered to a destination device with the land-line enterprise directory number associated with the originating employee included in the SMS as the origination number. Thus, an enterprise employee originating a SMS message from a cellular phone may have the SMS message delivered to the target device whereupon the SMS message is displayed as originating from the enterprise employee land-line phone number. In a similar manner, a person originating an SMS may enter the land-line number of an enterprise employee, and the MSISDN assigned to the cell phone of the enterprise employee may be substituted for the land-line number by the gateway server (either the GS-E or GS-C) and subsequently delivered to the enterprise employee's cell phone. In this manner, a user may be only aware of the employee's land-line enterprise directory number but may advantageously deliver SMS messages to the enterprise employee's cell phone as will be described more fully hereinbelow.

Figure 4A:
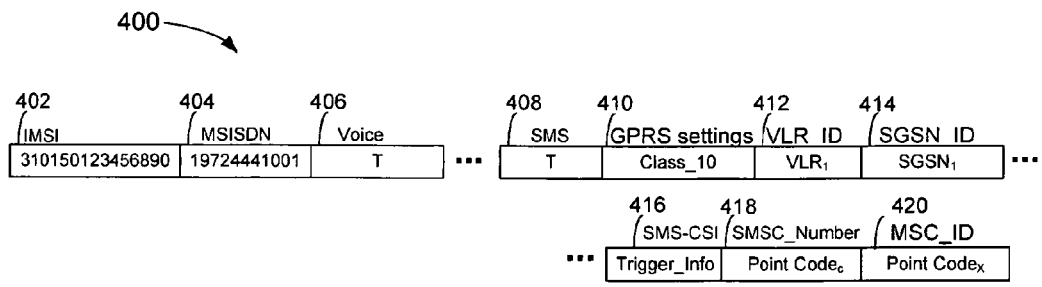
FIG. 4A is a diagrammatic representation of an exemplary HLR record that defines a subscriber profile implemented in accordance with an embodiment.

FIG. 4A is a diagrammatic representation of an exemplary HLR record 400 that defines a subscriber profile implemented in accordance with an embodiment. In general, HLR 124 may, and typically does, include thousands of records each associated with a particular mobile subscriber. Each HLR record includes details of a respective subscriber authorized to use cellular network 110. In the illustrative example, HLR record 400 is representative of an HLR record allocated for Party A's mobile terminal (mobile terminal 140 in FIGS. 1 and 2) in the depicted Figures.

HLR record 400 comprises a plurality of fields 402-420 which each store information regarding a particular mobile terminal assigned to a subscriber of cellular network 110. Fields 402-420 have respective labels of "IMSI", "MSISDN", "Voice", "SMS.", "GPRS_Settings", "VLR_ID", "SGSN_ID", "SMS-CSI", "SMSC_Number," and "MSC_ID". A particular field, e.g., IMSI field 402 and MSISDN field 404, may be designated as a key field and each respective data element is unique within key fields 402-404.

In the illustrative example, IMSI field 402 maintains an International Mobile Subscriber Identity (IMSI) stored in the subscriber identity module (SIM) of the mobile terminal for which HLR record 400 is allocated. The IMSI comprises a unique number associated with a particular mobile terminal. The IMSI is typically a 15-digit number having the first 3 digits that specify a mobile country code followed by a 3-digit mobile network code associated with cellular network 110 to which the mobile terminal is registered. The remaining digits may comprise a mobile subscriber identification number (MSIN) assigned to the customer (Party A in the present example) associated with the mobile terminal. In the illustrative example, the IMSI has a value of "3101501234567890" assigned thereto.

A mobile subscriber ISDN (MSISDN) field 404 may store the MSISDN, or directory number, assigned to the mobile terminal for which record 400 is allocated. In the illustrative example, the MSISDN field 404 specifies a MSISDN number of "19724441001", that is the directory number assigned to mobile terminal 140. Each of IMSI field 402 and MSISDN field 404 may be used as primary keys for accessing HLR record 400.

HLR record 400 may record various subscription services for the mobile terminal. In the illustrative example, various service fields may have values that indicate whether the subscriber for which the HLR record is allocated is authorized to use a particular service. In the present example, Voice field 406 has a value of true (T) that indicates that associated subscriber is authorized for voice service, and SMS field 408 has a value of true that indicates the mobile terminal is authorized to originate and receive SMS messages. Various other service fields may, and typically are, included in HLR 400 that each specify any one or more of various subscription services, such as call waiting, call forwarding, and the like.

A GPRS_Settings field 410 may specify whether the mobile terminal has a GPRS subscription and settings thereof. For instance, GPRS_Settings field 410 may have a false setting or have another indicator that specifies the mobile terminal associated with HLR record 400 does not have a valid GPRS subscription. In the event that the mobile terminal has a GPRS subscription, GPRS_Settings field 410 may specify a service class. In the illustrative example, GPRS_Settings field 410 specifies that the associated mobile terminal has a GPRS subscription with a service setting of "Class_10".

VLR_ID field 412 may specify the current VLR servicing the mobile terminal associated with HLR record 400. In the present example, VLR_ID field 412 indicates the mobile terminal is being serviced by a VLR having an ID of $VLR_1$. In a similar manner, SGSN_ID field 414 may specify the current SGSN servicing the mobile terminal associated with HLR record 400. In the present example, SGSN_ID field 414 indicates the mobile terminal is being serviced by an SGSN having an ID of $SGSN_1$.

An Short Message Service-Customized Applications for Mobile networks Enhanced Logic (CAMEL) Subscription Information (SMS-CSI) field 416 may contain trigger information required to invoke CAMEL Service Logic for Mobile Originating Short Message Submissions. In the illustrative example, the trigger information maintained in SMS-CSI field 416 is diagrammatically represented as "trigger_info". A short message service center (SMSC) Number field 418 may include an identifier, e.g., an SS7 point code, assigned to an SMSC that is to service the associated subscriber. In the illustrative example, SMSC_Number field 418 has a value of Point Code, assigned to SMSC 144 depicted in FIGS. 1 and 2. An MSC_ID field 420 may include an identifier, e.g., a point code, of the MSC currently, or most recently, servicing the mobile terminal associated with HLR record 400. In the present example, the point code of the MSC specified by MSC_ID field is represented as "Point $Code_x$".

Figure 4B:
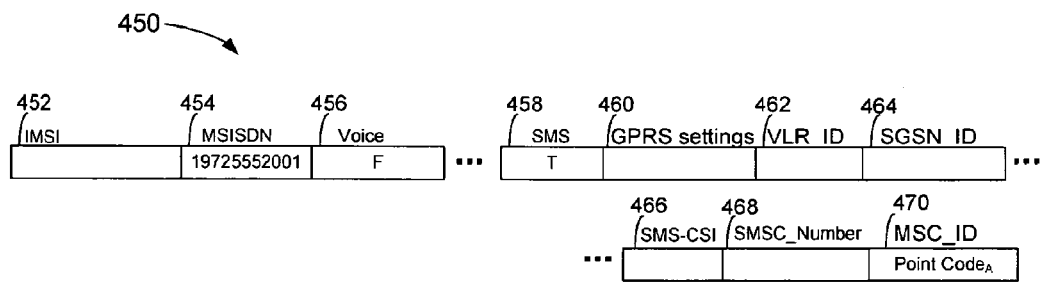
FIG. 4B is a diagrammatic representation of an exemplary HLR dummy record that may be associated with a land-line telephony device that facilitates one number services implemented in accordance with an embodiment.

To facilitate provisioning of one number service, the HLR may additionally include a "dummy" profile assigned to a land-line telephony device to facilitate one number voice and data services. FIG. 4B is a diagrammatic representation of an exemplary HLR record 450 that may be associated with a particular enterprise user that facilitates one number voice and data services. HLR dummy record 450 is assigned to a land-line telephony device assigned to an enterprise subscriber and is distinct from an HLR record assigned to the subscriber's mobile terminal. In the illustrative example, HLR record 450 is allocated for Party A that is a member of the enterprise network and is associated with Party A's enterprise land-line telephony device 154 depicted in FIGS. 1 and 2. HLR record 450 may include an IMSI field 452 that may be nulled or assigned an identifier that indicates that no IMSI is associated with the telephony device for which HLR record 450 is allocated. An MSISDN field 454 may have a land-line number assigned thereto for associating dummy HLR record 450 with a land-line telephony device. In the present example, MSISDN field 454 has a value of 19725552001, that is the enterprise directory number of the land-line device 154 assigned to Party A in FIGS. 1 and 2. HLR record 450 may include various service fields that indicate validity, invalidity, or other subscription characteristics of various services. In the present dummy HLR record 450 includes a Voice field 456 having a value false (F) that indicates voice services are not to be prescribed via the cellular network for the telephony device associated with dummy record 450. An SMS field 458, on the other hand, indicates SMS services are authorized for the telephony device for which dummy HLR record 450 is allocated. Thus, in the present example, HLR record 450 indicates SMS services are authorized for the telephony device specified by MSISDN field 454. Various fields 460-468 may be nulled. An MSC_ID field 470 may be assigned a value to redirect services associated with HLR dummy record 450 to an enterprise entity in accordance with an embodiment. In the present example, MSC_ID field 470 is assigned Point $Code_A$—the SS7 point code of GS-C 180 such that signaling normally directed to a MSC is instead directed to the GS-C that services the enterprise network of the land-line telephony device for which dummy HLR record 450 is allocated. In accordance with embodiments, SMS messages directed to the telephony device specified by MSISDN field 454 are ultimately routed to a cellular telephony device associated with HLR record 450 as will be described more fully hereinbelow.

Figure 5:
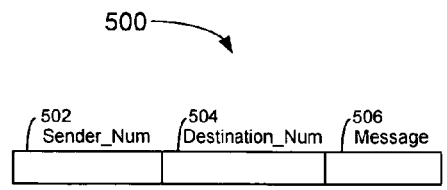
FIG. 5 is a simplified diagrammatic representation of an exemplary SMS message format implemented in accordance with an embodiment.

FIG. 5 is a simplified diagrammatic representation of an exemplary SMS message 500 format implemented in accordance with an embodiment. SMS message 500 may include a Sender_Num field 502 that includes the MSISDN of a mobile terminal that originates SMS message 500. Likewise, SMS message 500 may include a Destination_Num field 504 that includes the MSISDN of the destination mobile terminal to which SMS message 500 is directed. Alternatively, the Destination_Num field may be included in a header or may be included in fields or subfields included in SMS message 500 that are not depicted. A message field 506 may include the SMS message content. Various other fields, such as fields that specify the length of SMSC information, type of SMSC address, service center number, data coding scheme, timestamp, and various other information, may, and typically are, included in SMS message 500 as is understood. The depicted representation of SMS message 500 is simplified to facilitate an understanding of embodiments disclosed herein.

In accordance with embodiments, the phone numbers specified by Sender_Num field may be changed in transit of SMS message 500 to facilitate one number servicing of multiple telephony devices. For instance, for a subscriber that is to be provided with one number servicing, the subscriber may originate an SMS message from a mobile terminal assigned to the subscriber, and the sender number of the Sender_Num field 502 may be replaced with a land-line enterprise directory number of a land-line telephony device assigned to the user prior to delivery of the SMS message to the destination device. In this manner, the user receiving the SMS message is presented with the land-line phone number of the originator in the SMS message. In a similar manner, when an SMS message is directed towards a user that is provided with one number servicing, an enterprise directory number of a land-line telephone assigned to the user may be entered by an originating party as the destination number to which the SMS message is directed. The destination number comprising a land-line phone number may be changed in transit of the SMS message to a MSISDN number assigned to the destination user such that the SMS message is routed to the mobile terminal of the destination user. In this manner, a person originating an SMS message to a destination user that is provided with one number servicing need only be aware of the destination user's land-line enterprise directory number.

Figure 6A:
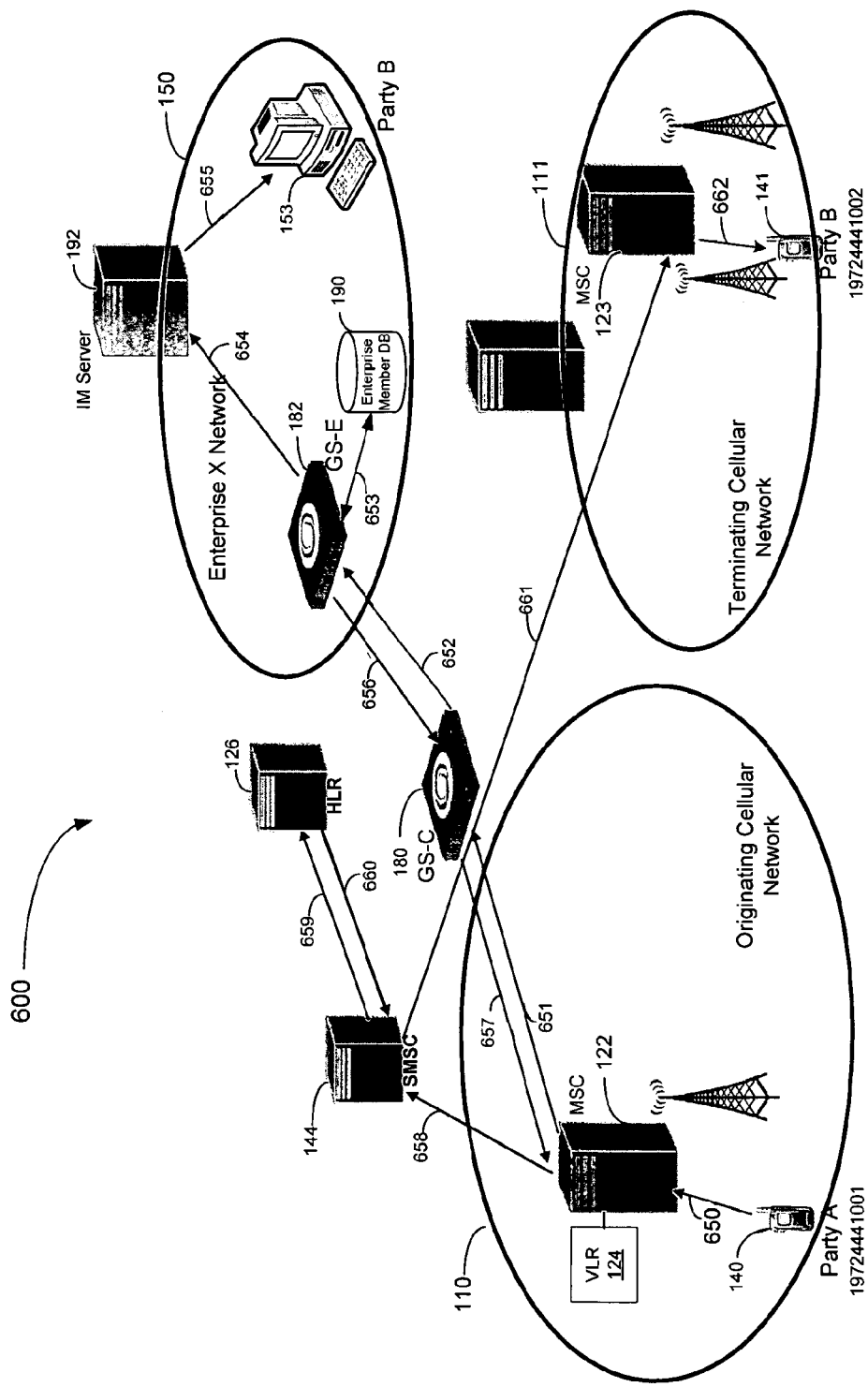
FIGS. 6A-9C are diagrammatic representations depicting signaling flows of an SMS transmission and representative SMS messages in a network system implementing one number servicing in accordance with a embodiments.

FIG. 6A is a diagrammatic representation depicting a signaling flow 600 of an SMS transmission in a network generally configured as depicted and described with reference to FIG. 2 from a mobile terminal user to another mobile terminal user implementing one number servicing in accordance with an embodiment. The network may include cellular networks 110 and 111 and an enterprise network 150. In an embodiment, one number servicing functionality provided in the system depicted in FIG. 6A may be implemented using CAMEL Phase 3 triggers for Short Message Service, although other trigger mechanisms may be suitably substituted therefor.

In the following example, assume Party A and Party B are mobile subscribers that are members of an Enterprise hosting enterprise network 150 and that are assigned respective mobile terminals 140 and 141. Party A's mobile number is +1-972-444-1001, and Party A's office number for land-line telephony device 154 deployed in enterprise network 150 is +1 972-555-2001. Further assume Party A's short code, or office extension, is 2001. Party B's mobile terminal 141 number is +1-972-444-1002, Party B's office number for land-line telephony device 155 deployed in enterprise network 150 is +1-972-555-2002, and Party B's short code is 2002.

Figure 6B:
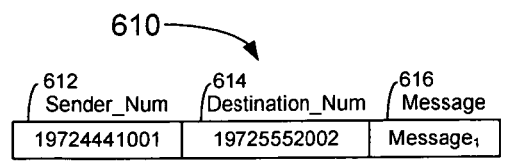

In a first example, Party A desires to send a SMS message to Party B. Party A can address the SMS message to either Party B's mobile number, office number, or short code. For purposes of illustration, assume Party A enters Party B's office number as the SMS destination number. Accordingly, an SMS message 610 is generated at mobile terminal 140 as generally depicted in FIG. 6B. SMS message 610 may include a Sender_Num field 612 assigned the MSISDN of mobile terminal 140, a Destination_Num field 614 assigned the enterprise directory number of Party B's land-line telephony device 155, and the SMS message content (illustratively designated "Message$_1$") in a Message field 616 as depicted in FIG. 6B. When Party B receives the SMS message, the originator's address will display as Party A's office number or short code in accordance with one number servicing implemented in accordance with an embodiment.

SMS message 610 as depicted in FIG. 6B is entered at mobile terminal 140 and is sent from Party A's mobile terminal 140 to a serving MSC 122 (step 650). MSC 122 includes or interfaces with a VLR 124 that has previously downloaded Party A's subscriber profile from the HLR to which Party A's mobile terminal 140 is registered as is understood. As the network supports CAMEL Phase 3, the Short Message Service CAMEL Subscription Information (SMS-CSI) is transferred to VLR 124. The SMS-CSI contains trigger information which is required to invoke CAMEL Service Logic for Mobile Originating Short Message submissions. In this case, MSC 122 will trigger to GS-C 180 which will act as the SMSC (step 651).

After the trigger is launched to the GS-C 180, GS-C 180 identifies the enterprise to which Party A belongs, and subsequently sends SMS message 610 to corresponding GS-E 182 (step 652). GS-E 182 verifies if the destination address of SMS message 610 is a member of Enterprise X by interrogating an Enterprise Member profile database 190. Enterprise Member profile database 190 may include records or profiles for respective enterprise members that associate a land-line number of an enterprise telephony device assigned to a particular enterprise member with a MSISDN number of a mobile terminal assigned to the enterprise member as described with reference to FIG. 2. In the present example, Party A has entered Party B's land-line number as the destination number of SMS message 610. Interrogation of profile database 190 with Party B's land-line number results in selection of a record 190b allocated for Party B that indicates the destination number is Party B's land-line and provides the MSISDN of Party B's mobile terminal 141 to GS-E 182. GS-E 182 may then modify the destination address of SMS message 610 to be the corresponding mobile number of Party B as depicted by SMS message 610 in FIG. 6C having a Destination_Num field 614 with the MSISDN of mobile terminal 141. This enables the message to be routed through the mobile network to the destination party.

In addition, the GS-E 182 retrieves the member record 190a assigned to Party A by interrogating Enterprise Member profile database 190 with Party A's mobile terminal number retrieved from Sender_Num field 612 of SMS message 610. Party A's member record 910a includes Party A's land-line number in association with Party A's mobile terminal MSISDN or directory number. Accordingly, GS-E 182 may modify the source address to be Party A's office number or short code in place of Party A's mobile number such that the recipient will receive the SMS with Party A's office number as the originator as depicted by Sender_Num field 612 of SMS message 610 in FIG. 6C.

In accordance with another embodiment, GS-E 182 may, upon determining the destination subscriber is a member of Enterprise X, invoke an enterprise messaging service, such as a corporate Instant Messaging service, for delivery of SMS message 610. For example, the member record for Party B retrieved from member database 190 may indicate that SMS messages are to be additionally delivered to Party B via an Instant Messaging service. Assuming the SMS message is to be additionally delivered to Party B via an Instant Messaging service, GS-E 182 may convert the SMS message to an Instant Message and send the IM to an Enterprise IM server 192 (step 654). The IM may then be forwarded to Party B, e.g., to Party B's enterprise desktop 153 (step 655). In addition, GS-E 182 may record the transaction as part of Party A's logs within the enterprise.

Figure 6C:
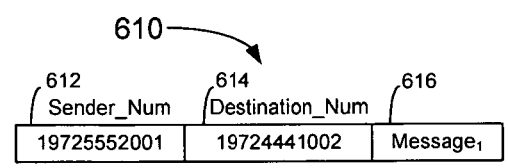

Delivery of SMS message 610 to Party B's mobile terminal 141 may continue with GS-E 182 responding to GS-C 180 (step 656), which in turn responds to the MSC 122 trigger with the instructions to route the message to SMSC 144 for delivery (step 657). MSC 122, in turn, forwards the SMS message to SMSC 144 for delivery to Party B (step 658). SMSC 144 then queries HLR 126 to determine the serving MSC 123 of the recipient based on the recipient's mobile number (step 659). HLR 126 responds to SMSC 144 with the serving MSC of the recipient (step 660). SMSC 144 will then deliver the message with the modifications made by GS-E 182 to MSC 123 (step 661) which delivers the SMS to mobile terminal 141 via an appropriate base station sub-system (step 662). The source address will be Party A's office number or short code, and the destination address will be Party B's mobile number as depicted in FIG. 6C.

Figure 7B:
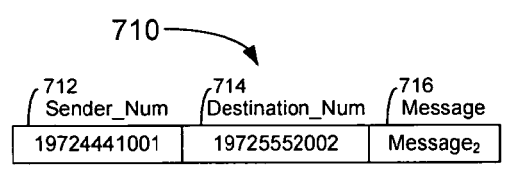
Figure 7C:
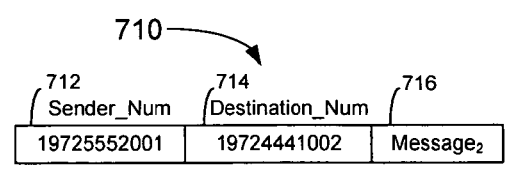
Figure 7A:
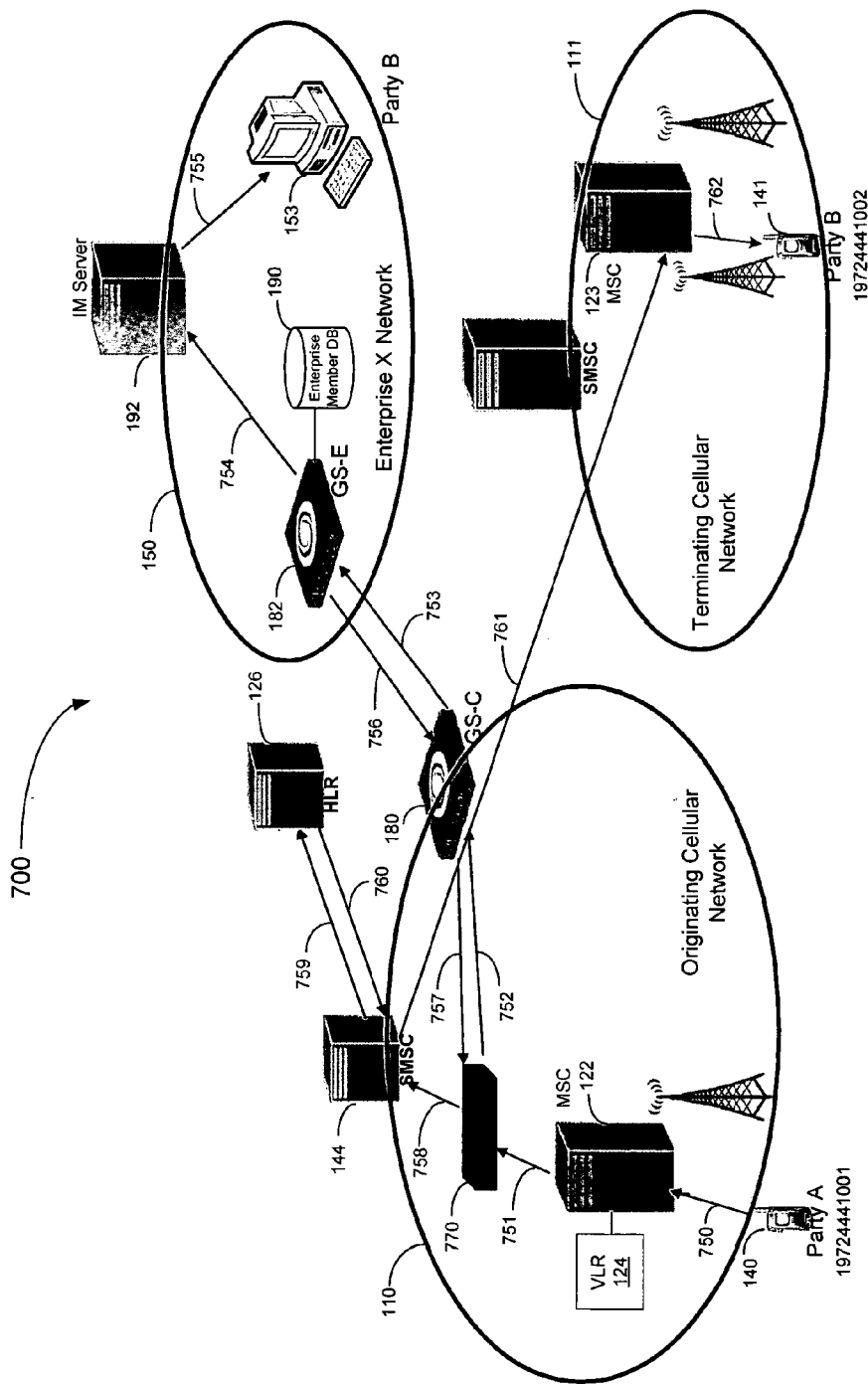

FIG. 7A is a diagrammatic representation depicting a signaling flow 700 of an SMS transmission in a network generally configured as depicted and described with reference to FIG. 2 from a mobile terminal user to another mobile terminal user implementing one number servicing in accordance with an embodiment. The network may include cellular networks 110 and 111 and an enterprise network 150.

As in the example depicted in FIG. 6A, Party A desires to send an SMS message to Party B, and for purposes of illustration assume Party A enters Party B's office number as the SMS destination number. Accordingly, an SMS message 710 is generated at mobile terminal 140 as generally depicted in FIG. 7B. SMS message 710 may include a Sender_Num field 712 assigned the MSISDN of mobile terminal 140, a Destination_Num field 714 assigned the enterprise directory number of Party B's land-line telephony device 155, and the SMS message content (illustratively designated "Message$_2$") in a Message field 716 as depicted in FIG. 7B.

In the present example, however, assume the network does not support CAMEL Phase 3 triggers. Instead, a Transparent Router 770 is placed in front of SMSC 144 and monitors the link for SMS messages originated by subscribers of the enterprise service. Subscriber A may originate SMS message 710 addressed to Subscriber B (step 750) that is transmitted to serving MSC 122 which attempts to forward the SMS to SMSC 144 (step 751). However, transparent router 770 detects the SMS message and evaluates whether the originator subscribes to the enterprise service. If the originator is not subscribed to the enterprise service, transparent router 770 may allow the message to pass through unmodified. Assuming Subscriber A is subscribed to the enterprise service, transparent router 770 intercepts the message and re-routes it to GS-C 180 (step 752) which forward SMS message 710 to GS-E 182 (step 753). GS-E 182 verifies if the destination address of the SMS message is a member of Enterprise X by interrogating an Enterprise Member profile database 190. In the present example, Party B, the destination party, is a member of Enterprise X. Assume Party A entered Party B's land-line number as the destination number of the SMS message. Interrogation of profile database 190 with Party B's land-line number results in selection of record 190*b* that indicates the destination number is Party B's land-line and provides the MSISDN of Party B's mobile terminal 141 to GS-E 182. GS-E 182 may then modify the destination address of the SMS message to be the corresponding mobile number of Party B as depicted by Destination_Num field 714 of SMS message 710 in FIG. 7C. This enables the message to be routed through the mobile network to the destination party.

In addition, GS-E 182 retrieves member record 190*a* assigned to Party A which includes Party A's land-line number. Accordingly, GS-E 182 may modify the source address to be Party A's office number or short code in place of Party A's mobile number such that the recipient will receive the SMS with Party A's office number as the originator as depicted by Sender_Num field 712 in FIG. 7C.

In accordance with another embodiment, GS-E 182 may, upon determining the destination subscriber is a member of Enterprise X, invoke an enterprise messaging service, such as a corporate Instant Messaging service, for delivery of the SMS message. For example, member record 190*b* for Party B retrieved from member database 190 may indicate that SMS messages are to be additionally delivered to Party B via an Instant Messaging service. Assuming the SMS message is to be additionally delivered to Party B via an Instant Messaging service, GS-E 182 may convert the SMS to an Instant Message and send the IM to an Enterprise IM server 192 (step 754). The IM may then be forwarded to Party B, e.g., to Party B's enterprise desktop 153 (step 755). In addition, GS-E 182 may record the transaction as part of Party A's logs within the enterprise.

Delivery of the SMS message to Party B's mobile terminal 141 may continue with GS-E 182 responding to GS-C 180 by returning the SMS message to be re-injected to GS-C 180 (step 756) with the modifications performed by GS-E 182 as depicted in FIG. 7C which forwards the SMS message to transparent router 770 (step 757). Transparent router 770, in turn, forwards the SMS message to SMSC 144 (step 758). SMSC 144 then queries HLR 126 to determine the serving MSC 123 of the recipient based on the recipient's mobile number (step 759). HLR 126 responds to SMSC 144 with the serving MSC 123 of the recipient (step 760). SMSC 144 will then deliver the message with the modifications made by GS-E 182 to MSC 123 (step 761) which delivers the SMS to mobile terminal 141 via an appropriate base station sub-system (step 762). The source address will be Party A's office number or short code, and the destination address will be Party B's mobile number as depicted in FIG. 7C.

Figure 8A:
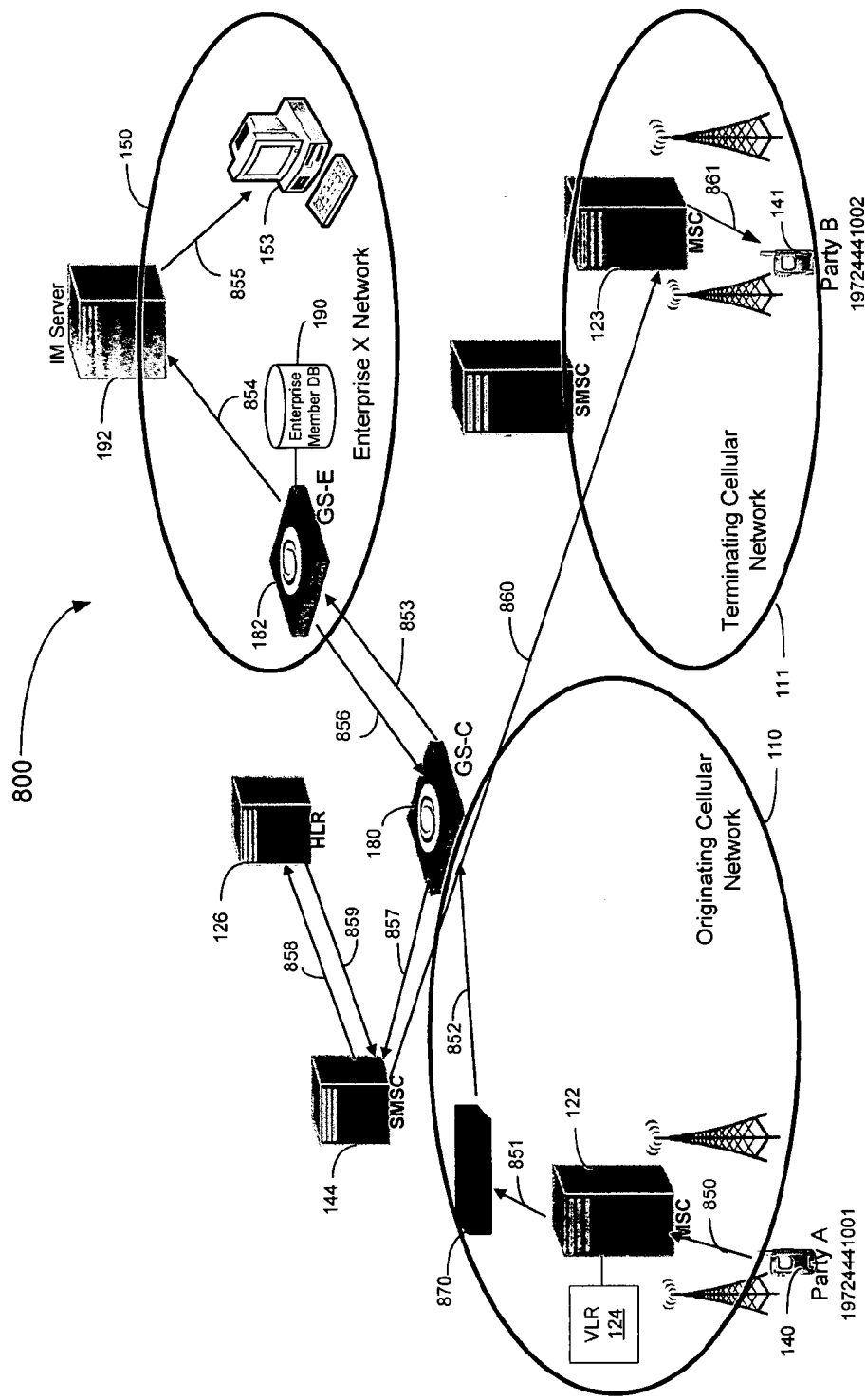

FIG. 8A is a diagrammatic representation depicting a signaling flow 800 of an SMS transmission in a network 100 generally configured as depicted and described with reference to FIG. 2 from a mobile terminal user to another mobile terminal user implementing one number servicing in accordance with an embodiment. The network may include cellular networks 110 and 111 and an enterprise network 150.

Figure 8B:
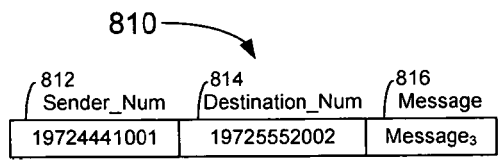

As in the example depicted in FIG. 7A, Party A desires to send a SMS message to Party B, and for purposes of illustration assume Party A enters Party B's office number as the SMS destination number. Accordingly, an SMS message 810 is generated at mobile terminal 140 as generally depicted in FIG. 8B. SMS message 810 may include a Sender_Num field 812 assigned the MSISDN of mobile terminal 140, a Destination_Num field 814 assigned the enterprise directory number of Party B's land-line telephony device 155, and the SMS message content (illustratively designated "Message$_3$") in a Message field 816 as depicted in FIG. 8B.

In the present example, however, a Transparent Router 870 is used only to intercept and re-route short messages originated by subscribers of the enterprise service, but is not used to re-inject the message once processed by the GS-E.

Subscriber A may originate SMS message 810 addressed to Subscriber B (step 850) that is transmitted to serving MSC 122 which attempts to forward the SMS to SMSC 144 (step 851). However, transparent router 870 detects SMS message 810 and evaluates whether the originator subscribes to the enterprise service. If the originator is not subscribed to the enterprise service, transparent router 870 may allow the message to pass through unmodified. Assuming Subscriber A is subscribed to the enterprise service, transparent router 870 intercepts the message and re-routes it to GS-C 180 (step 852) which forwards SMS message 810 to GS-E 182 (step 853). GS-E 182 verifies the destination address of SMS message 810 is a member of Enterprise X by interrogating Enterprise Member profile database 190. In the present example, Party B, the destination party, is a member of Enterprise X. Assume Party A entered Party B's land-line number as the destination number of SMS message 810. Interrogation of profile database 190 results in selection of record 190b that indicates the destination number is Party B's land-line number and provides the MSISDN of Party B's mobile terminal 141 to GS-E 182. GS-E 182 may then modify the destination address of the SMS message to be the corresponding mobile number of Party B as depicted by Destination_Num field 814 in FIG. 8C. This enables the message to be routed through the mobile network to the destination party.

In addition, GS-E 182 retrieves member record 190a assigned to Party A which includes Party A's land-line number. Accordingly, GS-E 182 may modify the source address to be Party A's office number or short code in place of Party A's mobile number such that the recipient will receive the SMS message with Party A's office number as the originator as depicted by the Sender_Num field 812 in FIG. 8C.

In accordance with another embodiment, GS-E 182 may, upon determining the destination subscriber is a member of Enterprise X, invoke an enterprise message service, such as a corporate Instant Messaging service, for delivery of the SMS message. For example, member record 190b for Party B retrieved from member database 190 may indicate that SMS messages are to be additionally delivered to Party B via an Instant Messaging service. Assuming the SMS message is to be additionally delivered to Party B via an Instant Messaging service, GS-E 182 may convert the SMS to an Instant Message and send the IM to an Enterprise IM server 192 (step 854). The IM may then be forwarded to Party B, e.g., to Party B's enterprise desktop 153 (step 855). In addition, GS-E 182 may record the transaction as part of Party A's logs within the enterprise.

Figure 8C:
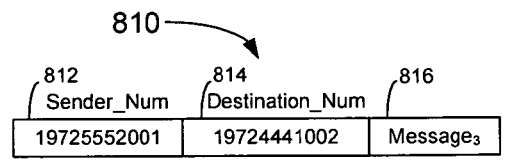

Delivery of SMS message 810 to Party B's mobile terminal 141 may continue with GS-E 182 responding to GS-C 180 by returning SMS message 810 to be re-injected to GS-C 180 (step 856) with the modifications performed by GS-E 182 as depicted by SMS message 810 in FIG. 8C. GS-C 180 may then forward the SMS message to SMSC 144 (step 857), rather than the transparent router as performed in the configuration depicted in FIG. 7A, with the modified information. In this instance, GS-C 180 is adapted to handle any response from SMSC 144 resulting from transmission of the SMS message thereto. SMSC 144 then queries HLR 126 to determine the serving MSC 123 of the recipient based on the recipient's mobile number (step 858). HLR 126 responds to SMSC 144 with the serving MSC of the recipient (step 859). SMSC 144 will then deliver the message with the modifications made by GS-E 182 to MSC 123 (step 860) which delivers the SMS to mobile terminal 141 via an appropriate base station sub-system (step 861). The source address will be Party A's office number or short code, and the destination address will be Party B's mobile number as depicted in FIG. 8C.

Figure 9B:
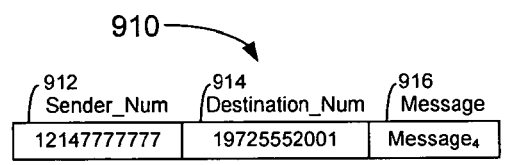
Figure 9C:
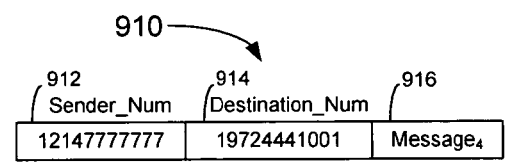
Figure 9A:
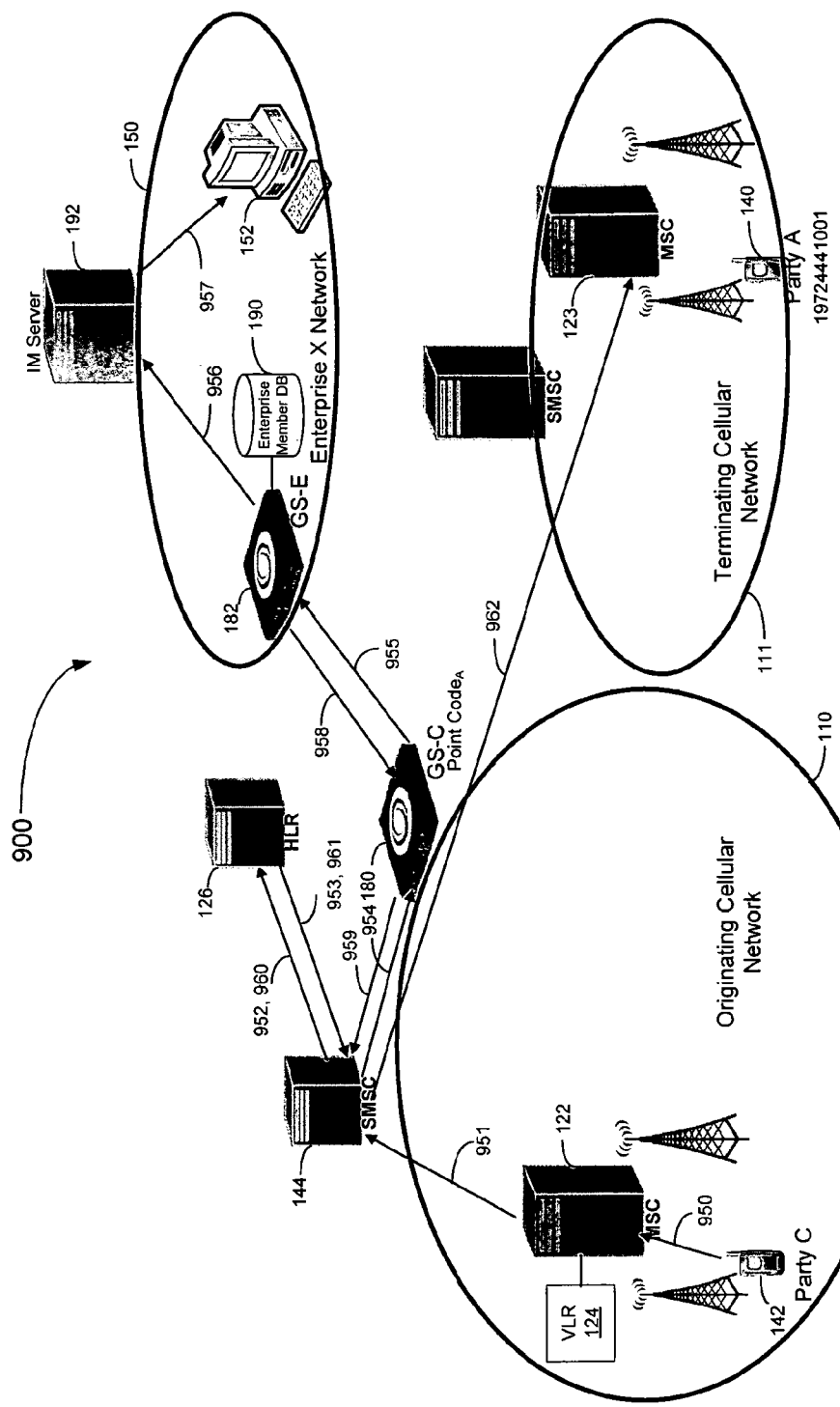

FIG. 9A is a diagrammatic representation depicting a signaling flow 900 of an SMS transmission in a network system from a mobile terminal user to another mobile terminal user implementing one number servicing in accordance with an embodiment. The network system may include cellular networks 110 and 111 and an enterprise network 150.

In the following example, assume Party C and Party A are mobile subscribers, Party C is not a member of the Enterprise hosting enterprise network 150, and that Party A is a member of the Enterprise hosting enterprise network 150. Further assume Party C and Party A are assigned respective mobile terminals 142 and 140. Party A's mobile number is +1-972-444-1001, Party A's office number is +1 972-555-2001, and Party A's short code is 2001. Party C's mobile number is +1-214-777-7777.

The non-enterprise subscriber may originate an SMS to the office number of the enterprise user at mobile terminal 142. Accordingly, an SMS message 910 is generated at mobile terminal 142 as generally depicted in FIG. 9B. SMS message 910 may include a Sender_Num field 912 assigned the MSISDN of mobile terminal 142, a Destination_Num field 914 assigned the enterprise directory number of Party A's land-line telephony device 154, and the SMS message content (illustratively designated "Message$_4$") in a Message field 916 as depicted in FIG. 9B. The SMS message is sent from mobile terminal 142 to servicing MSC 122 (step 950). MSC 122 includes or interfaces with a VLR 124 that has previously downloaded Party C's subscriber profile from the HLR to which Party C's mobile terminal 142 is registered as is understood. In this case, MSC 122 identifies SMSC 144 as the servicing SMSC and forwards the SMS message thereto (step 951.)

SMSC 144 may then query HLR 126 based on the office number entered by Party C as the destination to identify the serving MSC (step 952). Prior to this, HLR 126 will have been provisioned with a standalone, or dummy, subscriber profile for the enterprise user's office number similar to dummy HLR record 450 depicted and described with reference to FIG. 4B. Dummy record 450 will indicate Party A associated with the destination office number has SMS service. In addition, prior to these events, GS-C 180 will register with HLR 126 as the serving MSC of the enterprise subscriber in the HLR dummy profile associated with the office number. For instance, assume dummy HLR record 450 depicted in FIG. 4B is allocated for Subscriber A's land-line office telephony device 154. In this instance, GS-C 180 may be registered as the serving MSC of the land-line telephony device assigned to Party A by assigning the point code (illustratively designated Point Code$_A$) of GS-C 180 to the MSC_ID field 440 of dummy HLR record 450. The HLR profile associated with the enterprise subscriber's office number will be supported throughout mobile networks such that any MSC can query the HLR for the profile. Note that this HLR profile is entirely separate from the existing HLR profile associated with the enterprise subscriber's mobile number, i.e., HLR record 400. The handling of voice calls to the office number from mobile networks will be described in a subsequent section.

HLR 126 responds with the serving MSC being the GS-C 180 which had previously registered as the serving MSC (step 953). SMSC 144 may then send the SMS message to GS-C 180 accordingly (step 954). GS-C 180 identifies the enterprise to which the destination number (Subscriber A's land-line office number) belongs and routes SMS message 910 to corresponding GS-E 182 (step 955). GS-E 182 may modify the destination number to be the mobile number of the enterprise user, that is to the mobile number of mobile terminal 140, in order to enable the message to be routed through the mobile network as depicted by Destination_Num field 914 in FIG. 9C.

In accordance with another embodiment, GS-E 182, upon determining the destination subscriber is a member of Enterprise X, may invoke an enterprise message service, such as a corporate Instant Messaging service, for delivery of the SMS message. For example, the member record 190*a* for Party A retrieved from member database 190 may indicate that SMS messages are to be additionally delivered to Party A via an Instant Messaging service. Assuming the SMS message is to be additionally delivered to Party A via an Instant Messaging service, GS-E 182 may convert the SMS to an Instant Message and send the IM to an Enterprise IM server 192 (step 956). The IM may then be forwarded to Party A, e.g., to Party A's enterprise desktop 152 (step 957). In addition, GS-E 182 may record the transaction as part of Party A's logs within the enterprise.

Delivery of the SMS message to Party A's mobile terminal 140 may continue by GS-E 182 responding to GS-C 180 with the SMS message having the modified destination information (step 958). GS-C 180 may then originate an SMS message to SMSC 144 with the modified destination information as depicted in FIG. 9C (step 959).

SMSC 144 may then query HLR 126 based on the destination mobile number (step 960), and HLR 126 may respond with the serving MSC 123 of the enterprise user's mobile terminal 140 (step 961). SMSC 144 may then deliver the SMS message to MSC 123 and to the destination mobile terminal 140 (step 962).

Figure 10:
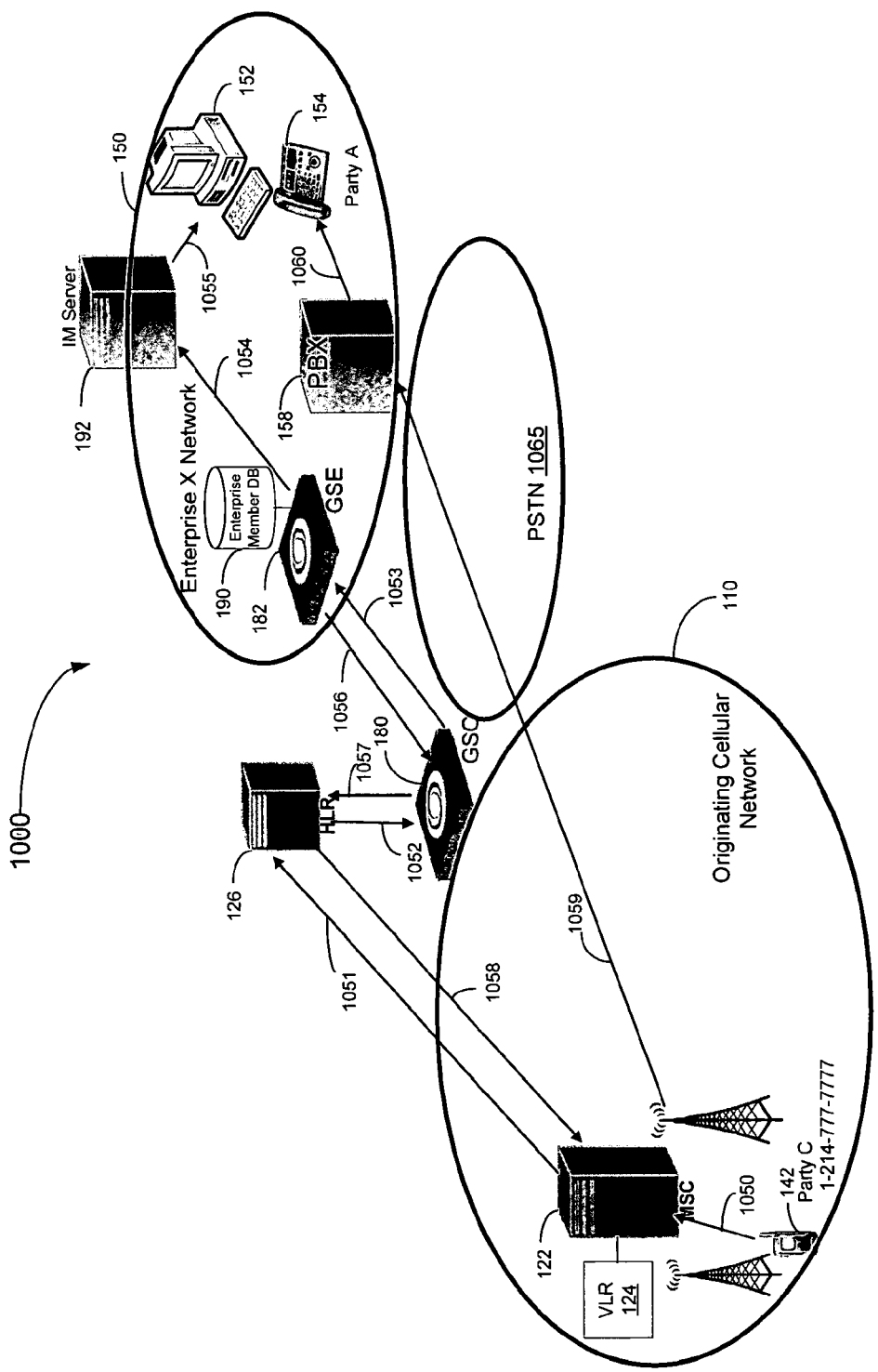
FIG. 10 is a diagrammatic representation depicting a signaling flow for handling of mobile originations for voice calls to an enterprise number which is provisioned in a mobile network HLR in accordance with an embodiment.

FIG. 10 is a diagrammatic representation depicting a signaling flow 1000 for handling of mobile originations for voice calls to an enterprise number which is provisioned in a mobile network HLR in accordance with an embodiment. This implementation enables voice calls originated in the mobile network to be routed out to the public land-line network in order to reach the office number destination in the land-line network.

In the following example, assume Party C is a mobile subscriber, and that Party A is a member of the Enterprise hosting enterprise network 150. Further assume Party C is assigned mobile terminal 142, and Party A is assigned office land-line telephony device 154. In this instance, assume Party A has a dummy HLR record similar to dummy HLR record 450 allocated in the HLR for land-line telephony device 154 to facilitate delivery (to Party A's mobile terminal 140) of SMS messages submitted with the enterprise directory number of device 154 as the destination number as described above.

A call may be originated by Party C at mobile terminal 142 to the office number of device 154 assigned to Party A (step 1050). As noted above, Party A has a profile in HLR 126 for the office number of device 154 for the purpose of enabling SMS messages submitted with the office number as the destination number.

MSC 122, on receipt of the call setup request, queries HLR 126 for a routing number to the serving MSC in order to deliver the call to the recipient (step 1051). HLR queries GS-C 180 that has previously registered as the serving MSC for the office number (step 1052). GS-C 180 is responsible for maintaining the periodic registrations such that the HLR profile continuously points to GS-C 180 as the serving MSC.

GS-C 180 identifies the enterprise network associated with the office number destination and sends the message to the corresponding GS-E (step 1053). GS-E 182 sets the routing number to be returned to the originating MSC to be the office number on the public network. GS-E 182 may also communicate with another enterprise messaging service (step 1054) to convey an incoming call to a user terminal (step 1055). In addition, GS-E 182 may record the transaction as part of Party A's logs within the enterprise.

GS-E 182 may then respond to GS-C 180 (step 1056) which in turn responds to HLR 126 (step 1057). HLR 126 then may respond to serving MSC 122 with the routing number to the serving MSC set to the office number on the public land-line network (step 1058).

With this information, originating MSC 122 routes the call to the routing number. The call is routed out to the public network 1065 to the office number which could be in the enterprise PBX 158 (step 1059). In this case, enterprise PBX 158 may route the call to the office number of telephony device 154 assigned to the subscriber (step 1060).

Figure 11:
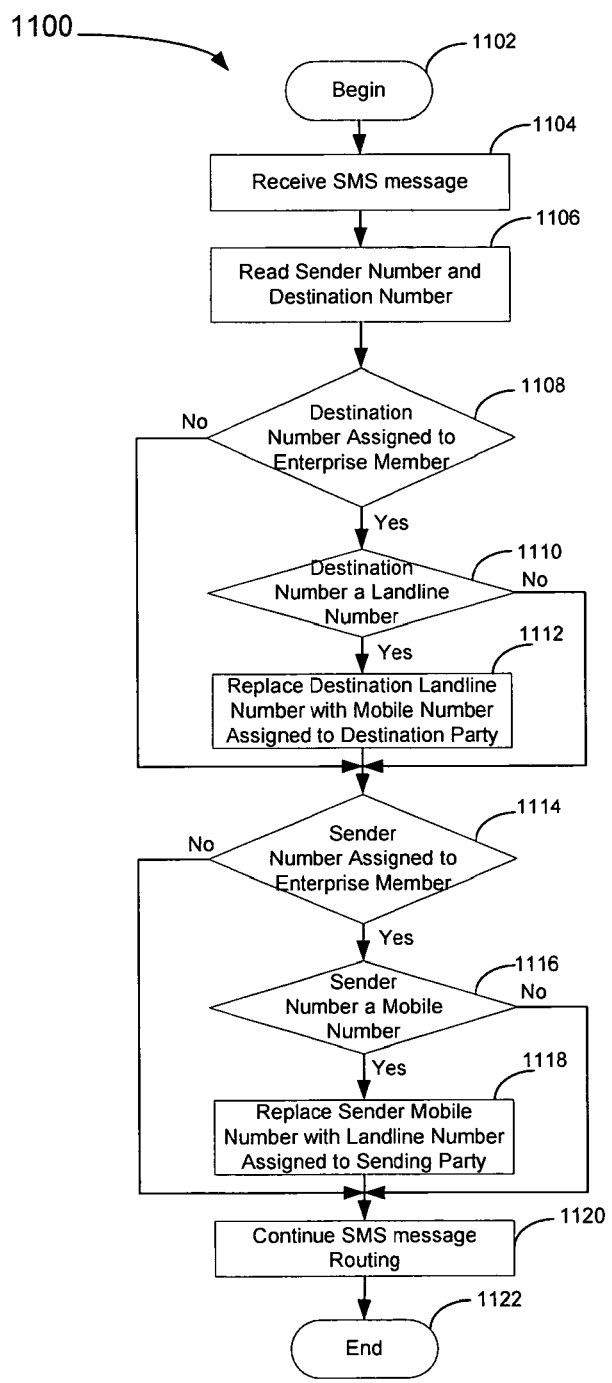
FIG. 11 is a flowchart of exemplary SMS message processing as may be implemented by an enterprise gateway server that facilitates one number service in accordance with an embodiment.

FIG. 11 is a flowchart of exemplary SMS message processing as may be implemented by an enterprise gateway server that facilitates one number service in accordance with an embodiment. The SMS message processing routine is invoked (step 1102), and the gateway server awaits receipt of an SMS message (step 1104). On receipt of an SMS message, the sender number and the destination number may be read from the SMS message (step 1106), e.g., from respective sender number and destination number fields 502 and 504. An evaluation may then be made to determine if the destination is assigned to an enterprise member (step 1108), e.g., by interrogation of enterprise member database 190 with the destination number read from the SMS message. In the event that the destination number is not assigned to an enterprise member, the SMS message processing routine may proceed to evaluate whether the sender number is assigned to an enterprise member (step 1114).

Returning again to step 1108, in the event that the destination number is evaluated as being assigned to an enterprise member, an evaluation may then be made to determine if the destination number is a land-line number assigned to the destination party (step 1110). In the event that the destination number is evaluated as comprising a land-line number, the processing routine may proceed to evaluate the sender number according to step 1114. In the event that the destination number is evaluated as a land-line number of a telephony device assigned to the destination party, the destination number of the SMS message may be replaced with the mobile, or MSISDN, number of the mobile terminal assigned to the destination party (step 1112). The SMS message processing routine may then continue to step 1114 to evaluate the sender number of the SMS message.

In the event that the sender number is not determined to be assigned to an enterprise member at step 1114, the SMS message processing routine may proceed to continue with routing of the SMS message (step 1120). Alternatively, if the sender number is determined to be assigned to an enterprise member at step 1114, the SMS processing routine may then evaluate whether the sender number is a mobile number of the mobile terminal assigned to the sending party (step 1116). In the event that the sender number is not evaluated as comprising a mobile number, the SMS message may be routed according to step 1120. If, however, the sender number is evaluated as comprising a mobile number of a mobile terminal assigned to the sending party, the sender number may be replaced with the land-line number assigned to the sending party (step 1118), and the gateway server may then continue with routing of the SMS message according to step 1120. The SMS message processing routine cycle may then end (step 1122).

Figure 12:
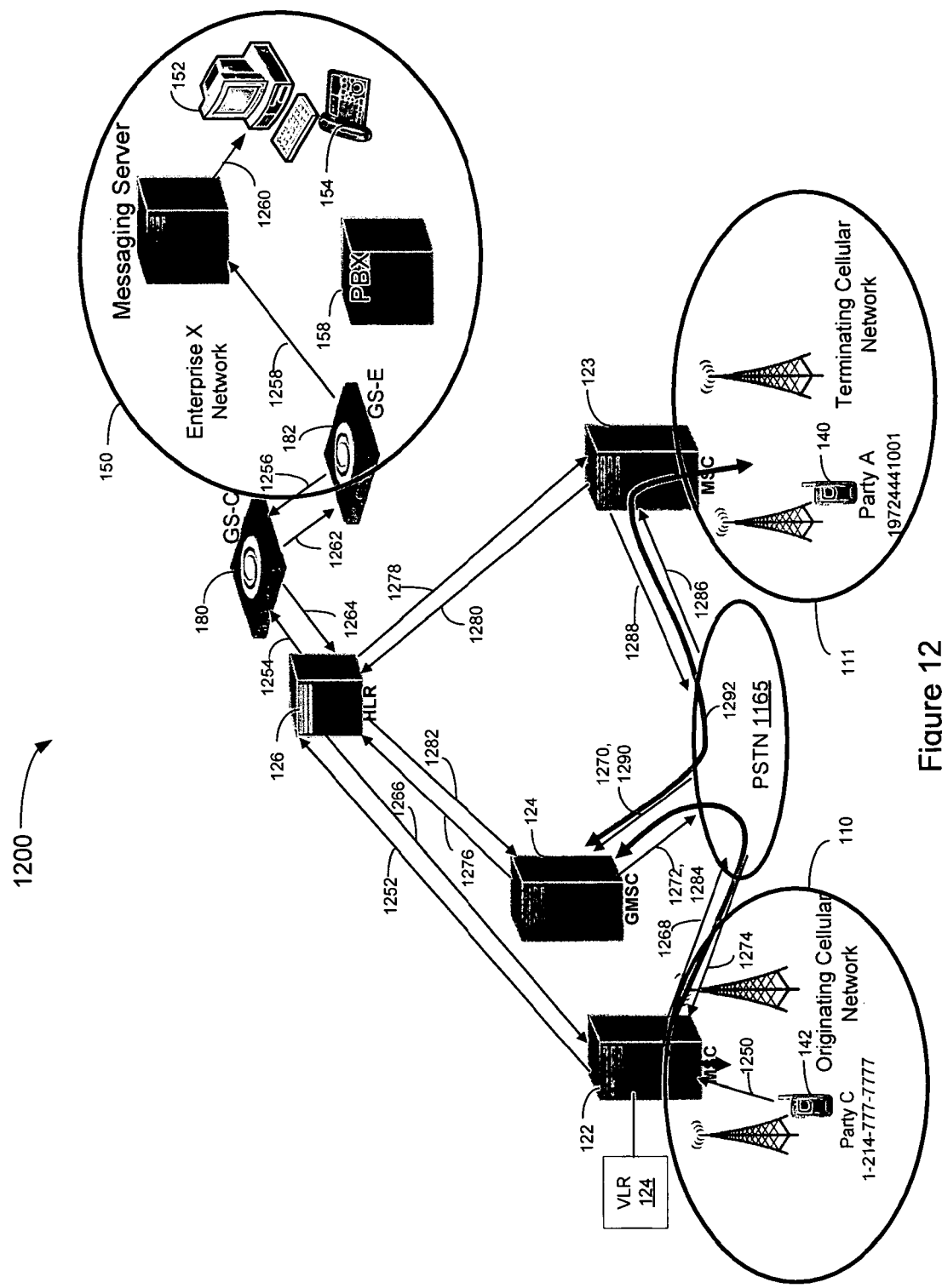
FIG. 12 is a diagrammatic representation depicting a signaling flow for handling of mobile originations for voice calls to an enterprise number which is provisioned in a mobile network HLR in accordance with an embodiment.

FIG. 12 is a diagrammatic representation depicting a signaling flow 1200 for handling of mobile originations for voice calls to an enterprise number which is provisioned in a mobile network HLR in accordance with an embodiment. This implementation enables voice calls originated in the mobile network to an enterprise number be automatically re-routed based on criteria in the GS-C and/or GS-E to the corresponding mobile number in the mobile network in order to reach the mobile subscriber associated with the enterprise number. As an example, this function may be used in an emergency situation when landline network connections to the enterprise are inoperable. In this case the GS-C and/or GS-E may be placed in an emergency routing mode such that mobile originated calls to enterprise numbers will instead be routed to their mobile devices.

In the following example, assume Party C is a mobile subscriber, and that Party A is a member of the Enterprise hosting enterprise network 150. Further assume Party C is assigned mobile terminal 142, and Party A is assigned office land line telephony device 154. In this instance, assume Party A has a dummy HLR record similar to dummy HLR record 450 allocated in HLR 126 for land line telephony device 154 to facilitate delivery (to Party A's mobile terminal 140) of SMS messages submitted with the enterprise directory number of device 154 as the destination number.

A call may be originated by Party C at mobile terminal 142 to the office number of device 154 assigned to Party A (step 1250). As noted above, Party A has a profile in HLR 126 for the office number of device 154 for the purpose of enabling SMS messages submitted with the office number as the destination number.

MSC 122, on receipt of the call setup request, queries HLR 126 for a routing number to the serving MSC in order to deliver the call to the recipient (step 1252). HLR queries GS-C 180 that has previously registered as the serving MSC for the office number (step 1254). GS-C 180 is responsible for maintaining the periodic registrations such that the HLR profile continuously points to GS-C 180 as the serving MSC.

GS-C 180 identifies the enterprise network associated with the office number destination and sends the message to the corresponding GS-E 182 (step 1256).

GS-E 182 sets the routing number to be returned to the originating MSC to be the corresponding mobile number of enterprise user Party A. Note that if GS-E 182 is not available, GS-C 180 may set the routing number to be returned to the originating MSC 122 to be the corresponding mobile number of the enterprise user Party A.

GS-E 182 may also communicate with another enterprise messaging service (step 1258) to convey an incoming call to user terminal 152 (step 1260). In addition, GS-E 182 may record the transaction as part of Party A's logs within the enterprise.

GS-E 182 may then respond to GS-C 180 (step 1262) which in turn responds to HLR 126 (step 1264). HLR 126 then may respond to serving MSC 122 with the routing number to the serving MSC set to the mobile number to be routed out to the public landline network (step 1266). If both Party C and Party A are subscribers on the same mobile operator network, the call would instead be routed directly from the MSC serving Party C to the GMSC in the same network of which Party A is a subscriber. Otherwise the call is routed out to the public network as described below.

The call is then routed via the public network (step 1268) to the Gateway MSC (GMSC) 124 of the network to which the mobile subscriber subscribes (step 1270). GMSC 124 responds to PSTN 1165 (step 1272) which in turn responds to MSC 122 (step 1274) after which the originating call leg is through-connected from the Party C, i.e., mobile terminal 142, to the GMSC 124.

GMSC 124 then queries HLR 126 (step 1276) to obtain a routing to the serving MSC of Party A. HLR 126 requests a routing number from serving MSC 123 (step 1278) which is returned to HLR 126 (step 1280). HLR 126 returns the routing number to GMSC 123 (step 1282). GMSC 123 then routes the call to the routing number over the public landline network 1165 (step 1284) to serving MSC 123 (step 1286). Serving MSC 124 responds (step 1288) to the public landline network 1165 which in turn responds to GMSC 124 (step 1290). The terminating call leg is through-connected to the serving MSC (step 1292).

As described, embodiments disclosed herein provide mechanisms for enabling the use of an alternative numbering plan for delivering short messages to mobile subscribers. Enterprise members or other users subscribed to a one number service may send short messages destined to members of an enterprise or closed network from their mobile or other devices associated with their subscription using an alternative enterprise directory number. The alternative enterprise directory number may comprise an office number of a land-line telephony device. The alternative enterprise directory number, rather than the mobile number, will be presented at the destination device as the originating number. The recipient can respond to the message by addressing the response to the enterprise or closed network number, and the SMS message will be delivered to the originator's mobile or other devices associated with their subscription.

Although the specific network architecture and nomenclature are depicted and described according to the GSM, it is understood that this is done so for illustrative purposes only and that the network architecture on which embodiments disclosed herein may be applied is not limited to any particular standard, but rather may be equivalently implemented on any other communications system supporting any variety of cellular communication systems, e.g. D-AMPS, GSM, CDMA, IS-41, ANSI-41, UMTS, etc.

The flowchart of FIG. 11 depicts process serialization to facilitate an understanding of disclosed embodiments and is not necessarily indicative of the serialization of the operations being performed. In various embodiments, the processing steps described in FIG. 11 may be performed in varying order, and one or more depicted steps may be performed in parallel with other steps. Additionally, execution of some processing steps of FIG. 11 may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the present invention may be implemented in software, hardware, firmware, or a combination thereof. The various elements of the system, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single computer processor or multiple computer processors. Additionally, various steps of embodiments of the invention may provide one or more data structures generated, produced, received, or otherwise implemented on a computer-readable medium, such as a memory.

Although embodiments of the present disclosure have been described in detail, those skilled in the art should understand that they may make various changes, substitutions and alterations herein without departing from the spirit and scope of the present disclosure.

What is claimed is:

1. A method, comprising:
   receiving a call to an enterprise network routing number wherein the enterprise network routing number is associated with the destination mobile device;
   processing the call via at least one of a carrier gateway server (GS-C) and an enterprise gateway server (GS-E);
   automatically re-routing the call from the enterprise network to a destination mobile device operating in the mobile network based on predefined routing criteria stored in at least one of the GS-C and the GS-E;
   detecting landline call routing services have been interrupted due to an emergency event prior to re-routing the call; and
   setting the predefined routing criteria of the GS-C and the GS-E to an emergency mode of operation responsive to identifying the emergency event;
   wherein the emergency event comprises one or more landline networks not being available.

2. The method of claim 1, wherein the enterprise network routing number is stored in a mobile network home location register (HLR).

3. The method of claim 1, wherein the enterprise network routing number is associated with the destination mobile device.

4. The method of claim 1, further comprising:
   setting the enterprise network routing number, via the GS-E, to be a corresponding mobile network routing number associated with the destination mobile device operated by an enterprise user assigned to the enterprise network routing number.

5. The method of claim 4, wherein if the GS-E is not available to perform call routing functions then setting the enterprise network routing number, via the GS-C, to be a corresponding mobile network routing number.

6. An apparatus, comprising:
   a receiver configured to receive a call to an enterprise network routing number wherein the enterprise network routing number is associated with the destination mobile device; and
   a processor configured to process the call, and automatically re-route the call from the enterprise network to a destination mobile device operating in the mobile network based on predefined routing criteria stored in at least one of a carrier gateway server (GS-C) and an enterprise gateway server (GS-E);
   wherein the processor is further configured to:
   detect landline call routing services have been interrupted due to an emergency event prior to re-routing the call; and
   set the predefined routing criteria of the GS-C and the GS-E to an emergency mode of operation responsive to identifying the emergency event;
   wherein the emergency event comprises one or more landline networks not being available.

7. The apparatus of claim 6, wherein the enterprise network routing number is stored in a mobile network home location register (HLR).

8. The apparatus of claim 6, wherein the enterprise network routing number is associated with the destination mobile device.

9. The apparatus of claim 6, wherein the processor is further configured to set the enterprise network routing number to be a corresponding mobile network routing number associated with the destination mobile device operated by an enterprise user assigned to the enterprise network routing number.

10. A non-transitory computer readable storage medium configured to store instructions that when executed cause a processor to perform:
    receiving a call to an enterprise network routing number wherein the enterprise network routing number is associated with the destination mobile device;
    processing the call via at least one of a carrier gateway server (GS-C) and an enterprise gateway server (GS-E); and
    automatically re-routing the call from the enterprise network to a destination mobile device operating in the mobile network based on predefined routing criteria stored in at least one of the GS-C and the GS-E;
    wherein the processor is further configured to perform:
    detecting landline call routing services have been interrupted due to an emergency event prior to re-routing the call;
    setting the predefined routing criteria of the GS-C and the GS-E to an emergency mode of operation responsive to identifying the emergency event;
    wherein the emergency event comprises one or more landline networks not being available.

11. The non-transitory computer readable storage medium of claim 10, wherein the enterprise network routing number is stored in a mobile network home location register (HLR).

12. The non-transitory computer readable storage medium of claim 10, wherein the enterprise network routing number is associated with the destination mobile device.

13. The non-transitory computer readable storage medium of claim 10, wherein the processor is further configured to perform:
    setting the enterprise network routing number, via the GS-E, to be a corresponding mobile network routing number associated with the destination mobile device operated by an enterprise user assigned to the enterprise network routing number.

14. The non-transitory computer readable storage medium of claim 13, wherein if the GS-E is not available to perform call routing functions then setting the enterprise network routing number, via the GS-C, to be a corresponding mobile network routing number.

* * * * *